United States Patent [19]

Nadherny

[11] Patent Number: 5,388,943
[45] Date of Patent: Feb. 14, 1995

[54] COTTER PIN GUARD AND RETAINER

[75] Inventor: Rudolph E. Nadherny, Naperville, Ill.

[73] Assignee: Ireco, Inc., Chicago, Ill.

[21] Appl. No.: 131,650

[22] Filed: Oct. 5, 1993

[51] Int. Cl.6 .................................. F16B 21/14
[52] U.S. Cl. .......................... 411/513; 411/364
[58] Field of Search ............... 411/363, 364, 513, 514, 411/515, 320, 526; 403/155, 315, 316

[56] References Cited

U.S. PATENT DOCUMENTS

| | | |
|---|---|---|
| 750,501 | 1/1904 | Tarbox . |
| 832,386 | 10/1906 | Hughes ................. 411/513 |
| 1,751,013 | 3/1930 | McMullen . |
| 1,918,148 | 7/1933 | Strickland . |
| 2,122,073 | 6/1938 | Schaefer . |
| 2,345,141 | 3/1944 | McMullen . |
| 2,391,140 | 12/1945 | Dilley . |
| 2,559,737 | 7/1951 | Schaefer . |
| 3,292,480 | 12/1966 | Uozumo ................. 411/513 |
| 3,357,294 | 12/1967 | Taylor ................. 403/316 |
| 5,152,652 | 10/1992 | Nadherny ................. 411/513 |

FOREIGN PATENT DOCUMENTS 1269551  5/1990  Canada ................. 411/526

*Primary Examiner*—Flemming Saether
*Attorney, Agent, or Firm*—Lockwood, Alex, FitzGibbon & Cummings

[57] ABSTRACT

A device for guarding and retaining a cotter pin in place after insertion in a pin or bolt. The device is formed from springy sheet material, preferably in the form of a spring steel stamping. It has a washer portion with a central opening to fit over a pin or bolt and a shelf portion extending to one side. The washer portion has one or more tabs or spurs which frictionally engage the shank of a pin or bolt so as to retain the washer in place thereon. The shelf portion is joined to the washer portion by a step or shoulder. At its outer end the shelf has a fence which extends from the floor of the shelf in the same direction as the step. The step has an opening through which the shank of a cotter pin may be inserted on through the aperture in a pin or bolt. The shelf may be flexed so the fence is out of the way when a cotter pin is inserted. On release the shelf springs back in place and the fence is in position to engage the head of the cotter pin and prevent its removal. The device can be used with pins or bolts which fit the central opening in the washer portion with little clearance or which are undersized with respect to the central opening.

9 Claims, 3 Drawing Sheets

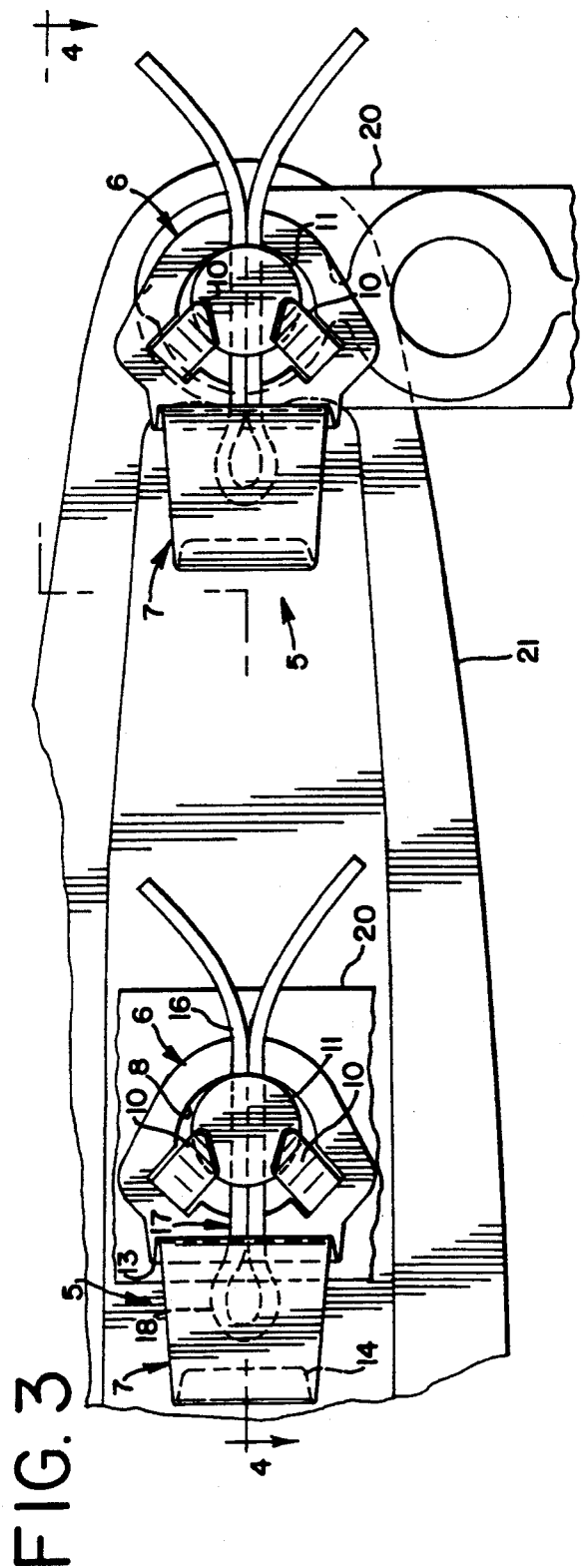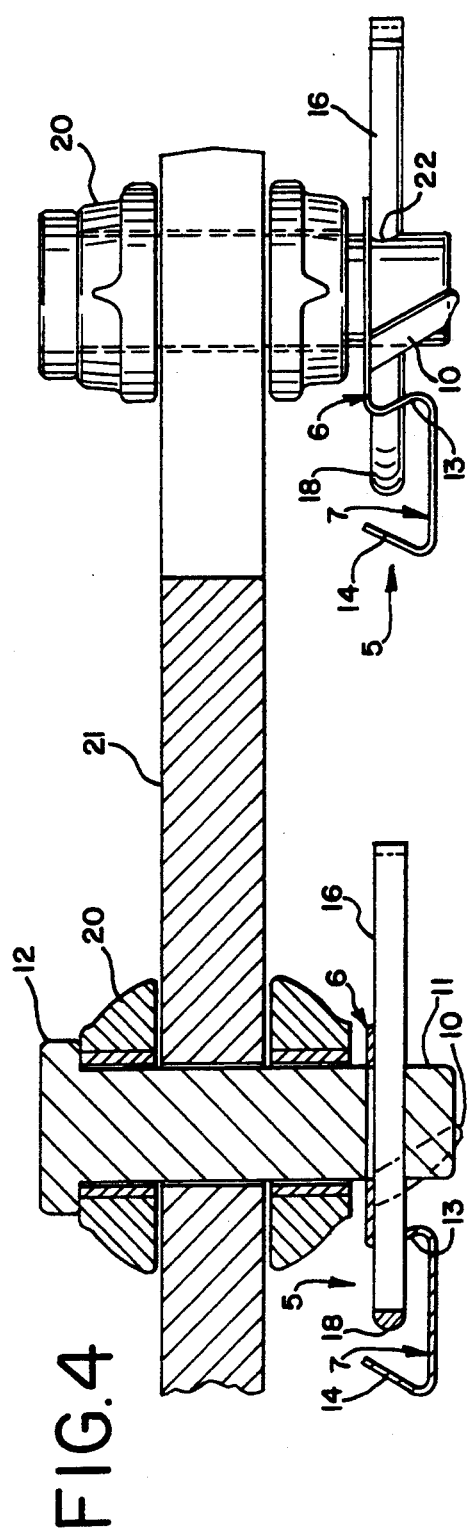

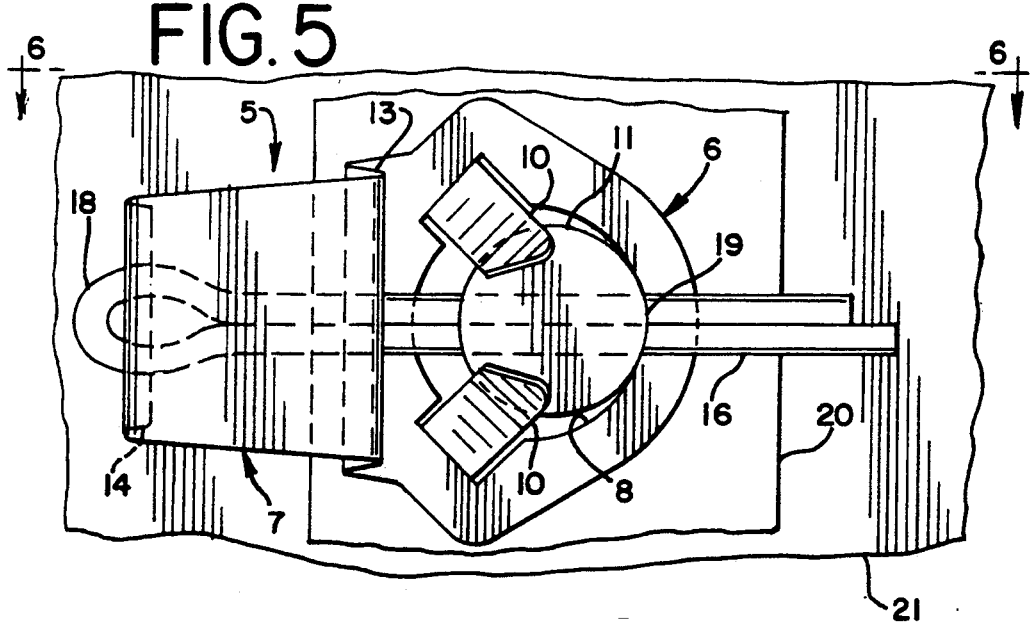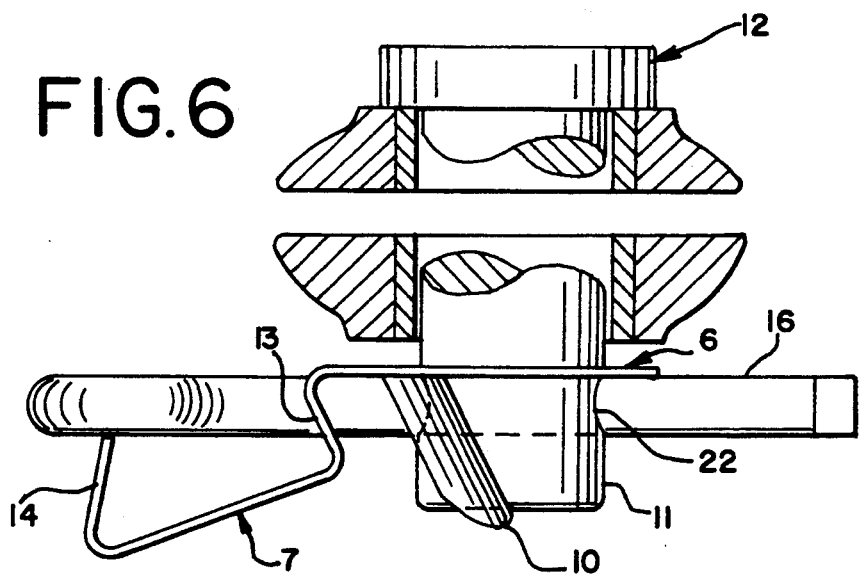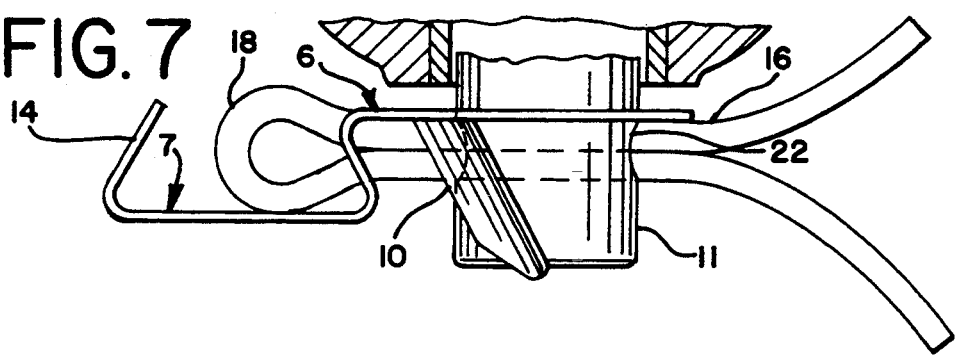

COTTER PIN GUARD AND RETAINER

BACKGROUND AND DESCRIPTION OF THE INVENTION

This invention relates, generally, to innovations and improvements in devices for retaining and guarding cotter pins in place after their insertion in cotter pin receiving apertures extending transversely through the shanks of pins or bolts such, for example, as brake pins used in the railroad car industry.

Cotter pins have long been used as a means for securing pins and bolts in place in a variety of settings. A primary example has been the use of cotter pins for retaining brake pins in place in railroad car brake riggings. Such brake pins may range in size from 1 3/32 inch shank diameter up to 1 11/32 inch shank diameter and have small transverse apertures large enough to receive the shanks of cotter pins. After a cotter pin has been inserted in a brake pin and spread it serves to prevent the pin from being inadvertently removed from the parts which it is relied on to interconnect. However, there are instances in which cotter pins fail to perform their intended retaining and securing function. For example, a workman may fail to spread apart the halves of a cotter pin shank. In such cases, in the absence of a retainer and guard, it is usually only a matter of time before an unspread cotter pin will fall out of place. The loss of a cotter pin occurs sufficiently often so that this possibility creates a safety problem particularly where a cotter pin is being used in connection with a pin or bolt which is being relied upon to connect or secure together parts which create an unsafe condition if inadvertently disconnected.

The object of the present invention, generally stated, is the provision of an inexpensive, mass-producible cotter pin retainer and guard which will prevent the inadvertent or accidental removal of a cotter pin after it has been inserted in a pin or bolt.

Certain more specific objects of the invention will be apparent to those skilled in the art upon obtaining a complete understanding of the nature and scope of the invention in light of the following detailed description of preferred embodiments thereof taken in connection with the accompanying drawings wherein:

FIG. 3 is a fragmentary bottom plan view showing a typical installation wherein two cotter pin guard and retainers of FIG. 1 are utilized in connecting the ends of two brake rods to a brake lever;

FIG. 4 is a view partly in elevation and partly in section taken on line 4—4 of FIG. 3;

FIG. 5 is a plan view showing one of the cotter pins of FIGS. 3 and 4 partially inserted in the brake pin and a cotter pin guard and retainer;

FIG. 6 is a fragmentary, side elevational view taken on line 6—6 of FIG. 5;

FIG. 7 is a view corresponding to FIG. 6 but showing the cotter pin fully in place and in its spread condition;

Figure 1:
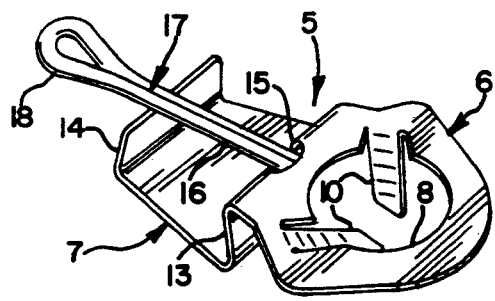
FIG. 1 is a perspective view of a cotter pin guard and retainer embodying the invention and showing a cotter pin partially inserted therein.

In FIGS. 1-7, a cotter pin and retainer guard embodying the present invention is indicated generally at 5 comprising a washer portion 6 and a shelf portion 7. The opening 8 in the washer portion 6 is large enough to accommodate the shanks of cotter pins ranging from a maximum diameter that is the largest that the opening 8 will accept on down to smaller diameter shanks. For example, brake pins generally come in three different sizes, namely, 1 3/32, 1 7/32 and 1 11/32.

The cotter pin lock and guard 5 is formed from a springy or resilient sheet material such as spring steel or a suitable plastic. Preferably, it is formed as a stamping so that it can be mass produced at a minimum cost.

The particular cotter pin retainer and guard 5 has two integrally formed pin-engaging tabs or spurs 10-10 which are bent inwardly toward the center of the opening 8 so that the distal ends thereof will engage the shank 11 of a pin such as the brake pin indicated generally at 12 in FIGS. 2-7.

The shelf 7 is integrally connected to the washer portion 6 by an inclined step or shoulder 13. At its distal or outer end or edge, the shelf portion 7 has an inclined fence 14 which extends upwardly from the shelf 7 as viewed in FIGS. 1 and 2 so as to form an acute angle with the shelf 7. The step 13 is provided with an opening 15 for receiving the shank 16 of a cotter pin indicated generally at 17. Preferably, the opening 15 is located at the upper portion of the step 13 where it joins the washer portion 6. The opening 15 is large enough to readily accept the shank 16 of the cotter pin 17 but is too small to accept its head 18.

Reference is now made to FIGS. 3-7 for a description of a typical representative use of the combination cotter pin guard and retainers 5. In these figures, brake pins 12 are shown connecting brake rods 20—20 to a brake lever 21. After the brake pins 11 have been inserted through the aligned apertures in the respective brake rods 20 and the brake lever 21 as shown, a cotter pin guard and retainer 5 is then placed over the distal end of each brake pin 12 with the shank 11 of the brake pin passing through the opening 8 in the washer portion 6 of each guard and retainer 5. This placement is such that the washer portion 6 is approximately even with the top of the cotter pin receiving aperture 22 in each brake pin 12. At this point, the shank 11 of each brake pin 12 will have engaged and spread the retention tabs 10 which assist in the positioning of the guard and retainer 5. The shank 16 of a cotter pin 17 is now inserted through the opening 15 in the step 13 and on through the aperture 22 in the shank of the brake pin 12. As shown in FIGS. 5 and 6, the insertion of the cotter pin 7 in this manner causes the temporary downward deflection of the shelf portion 7 due to engagement of the head 18 of the cotter pin 17 with the top edge of the fence 14. The insertion of the cotter pin 17 is continued until the head 18 engages the step 13. At this point the head 18 is rotated 90 degrees as shown in FIG. 7 and the halves of the shank 16 are spread apart in the usual manner. Usually, the head 18 of the cotter pin will again be rotated 90 degrees as shown in FIG. 3 and 4 so that it lies within the shelf portion 7.

Figure 2:
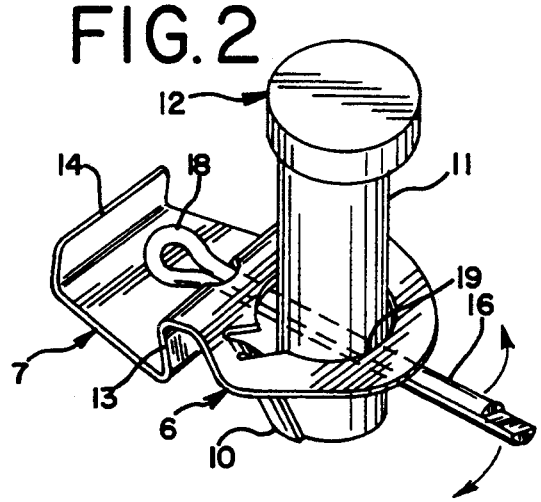
FIG. 2 is a perspective view of the cotter pin guard and retainer of FIG. 1 showing the cotter pin fully inserted in the guard and retainer and in the cotter pin receiving aperture in a brake pin in place in the guard and retainer.

After the installation or assembly of a cotter pin guard and retainer 5 and cotter pin 17 on a brake pin 12 has been completed, the tabs or spurs 10, due to their resilient engagement with the shank 11 of the brake pin 12, serve to retain the components of the assembly in the proper assembled relationship and to resist loosening due to vibration. As shown in FIG. 2, the tabs 10 push against the shank 11 of the brake pin 12 and thereby cause the washer portion 6 to engage the shank 11 at 19. Thus, there is 3-point spaced engagement of the retainer 5 with the shank 11, with the tabs providing two points of engagement and the engagement at 19 providing the third point of engagement. This 3-point engagement resists shifting of the washer portion 6, and in turn, the entire retainer 5 relative to the shank 11.

It will be noted that the fence 14 is inclined toward the step 13. This is a significant feature which becomes important if a workman fails to spread a cotter pin after inserting it. Under this condition, a cotter pin 17 is free to move outwardly until its head 18 engages the fence 14 and tends to work into a trapped condition at the bottom of the fence.

Figure 8:
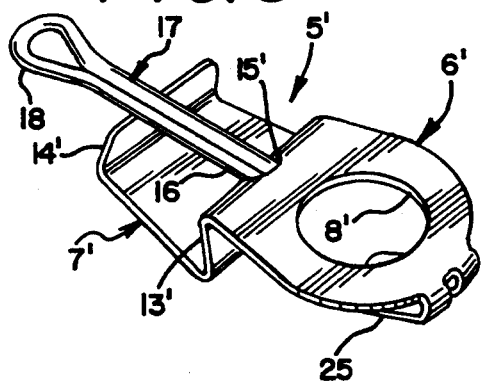
FIG. 8 is a perspective view of a second embodiment of the invention corresponding to FIG. 1.
Figure 9:
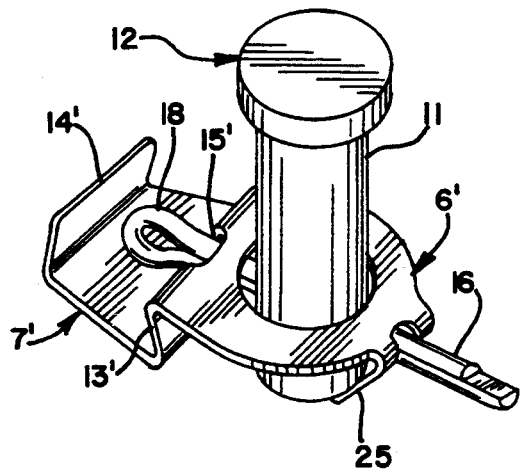
FIG. 9 is a perspective view of the second embodiment of the invention and corresponding to FIG. 2.

In FIGS. 8 and 9 a cotter pin guard and retainer 5' is indicated which forms a second embodiment of the invention. The embodiment 5' corresponds to the cotter pin retainer and guard 5 of FIGS. 1 and 2 except that the tabs or spurs 10 of the guard and retainer 5 of FIGS. 1 and 2 have been replaced by a single tab 25. The tab 25 is bent so that its free or distal end projects into the path of the opening 8 so as to engage the shank 11 of a brake pin 12 as shown in FIGS. 8 and 9. It will be noted that the tab 25 is attached to the collar portion 6' at the periphery opposite the step 13'.

Figure 10:
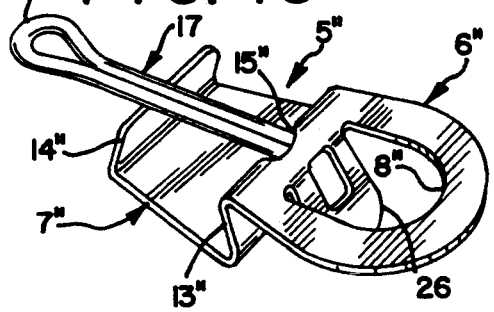
FIG. 10 is a perspective view showing a third embodiment of the invention and corresponding to FIGS. 1 and 8.
Figure 11:
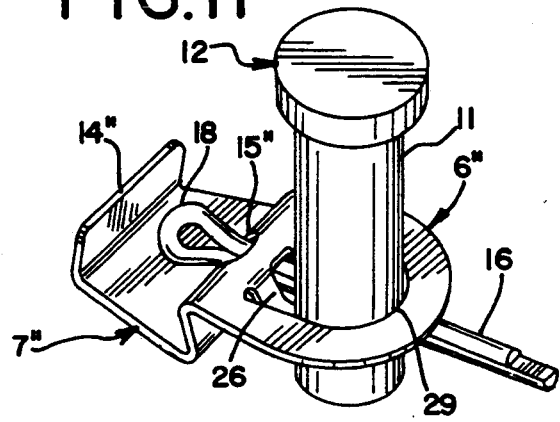
FIG. 11 is a perspective view of a third embodiment corresponding to FIGS. 2 and 9.

In FIGS. 10 and 11 a cotter pin guard and retainer is indicated generally at 5'' which forms a third embodiment of the invention. In this embodiment a brake pin engaging tab 26 is attached to the collar portion 6'' at the side of the opening 8'' which is adjacent the step 13''. Due to this location of the tab 26 it presses against the shank 11 of the brake pin and causes the collar 6'' to engage the shank at 29 (FIG. 11). As in the case of the tabs 10, this engagement eliminates play between the guards 5' and 5'' respectively if the head 18 of an unspread cotter pin 18 engages the fence 14' or 14''.

What is claimed is:

1. A device for guarding and retaining a cotter pin in place after being inserted in a cotter pin receiving aperture extending transversely through a shank of a pin or bolt comprising, an integral piece of springy sheet material having a washer portion and a shelf portion, said washer portion having a central opening therein for receiving the shank of the pin or bolt and at least one tab extending into frictional retaining engagement with the shank of the pin or bolt extending through said central opening, and said shelf portion being offset to one side of said washer portion and connected thereto by a step having an opening through which a shank of the cotter pin can be inserted and pass on into said cotter pin receiving aperture, and the edge of said shelf opposite said step having a cotter pin head retaining fence thereon, said shelf portion flexing at said connection to said washer portion under applied force so as to permit the insertion of the shank of the cotter pin through said opening in said step and said cotter pin receiving aperture and returning to its normal non-flexed condition upon removal of said applied force whereby a head of the inserted cotter pin is trapped between said fence and said step thereby guarding and retaining the inserted cotter pin in place.

2. The device called for in claim 1 wherein each said at least one tab has said frictional engagement with the shank of the pin or bolt which is undersized with respect to said central opening in said washer portion.

3. The device called for in claim 1 wherein there is a plurality of said tabs.

4. The device of claim 1 wherein said springy sheet material is spring steel.

5. The device of claim 1 wherein the said washer portion and said shelf portion lie in parallel planes.

6. The device of claim 1 wherein said opening in said step is too small to allow the head of a cotter pin to pass through.

7. The device called for in claim 1 wherein said at least one tab extends from said washer portion in generally a same direction that said step extends from said washer portion and forms an acute angle with said shelf portion.

8. The device called for in claim 1 wherein there is a single tab and its proximal end is connected to said washer portion at said opening therein on a side thereof adjacent said shelf portion whereby the distal end of said tab engages the shank of the pin or bolt extending through said opening and presses the shank of the pin or bolt into engagement with said washer portion at a side of said opening therein remote from said shelf portion.

9. The device called for in claim 1 wherein there is a pair of said tabs and the proximal ends of said tabs are connected in symmetrical spaced apart relationship with respect to said washer portion at said opening therein on a side thereof adjacent said shelf portion whereby the distal ends of said tabs engage the shank of the pin or bolt extending through said opening and together press the shank of the pin or bolt into engagement with said washer portion at a side of said opening therein remote from said shelf portion, and said engagement of the distal ends of said tabs with said shank together with said engagement of said washer portion with said shank forms a three-point support for said shank in said opening so as to resist lateral shifting of said shank in said opening.

* * * * *